United States Patent [19]

Ando

[11] Patent Number: 5,504,923
[45] Date of Patent: Apr. 2, 1996

[54] PARALLEL PROCESSING WITH IMPROVED INSTRUCTION MISALIGNMENT DETECTION

[75] Inventor: Hideki Ando, Hyogo, Japan

[73] Assignee: Mitsubishi Denki Kabushiki Kaisha, Tokyo, Japan

[21] Appl. No.: 305,983

[22] Filed: Sep. 19, 1994

Related U.S. Application Data

[63] Continuation of Ser. No. 905,988, Jun. 29, 1992, abandoned.

[30] Foreign Application Priority Data

Jul. 9, 1991 [JP] Japan .................................. 3-168063

[51] Int. Cl.$^6$ ............................................. G06F 9/38
[52] U.S. Cl. .................... 395/800; 395/375; 364/230; 364/262.4; 364/DIG. 1
[58] Field of Search ................................ 395/800, 775, 395/650, 425, 375; 364/130–134

[56] References Cited

U.S. PATENT DOCUMENTS

| | | | |
|---|---|---|---|
| 4,295,193 | 10/1981 | Pomerene | 395/375 |
| 4,847,755 | 7/1989 | Morrison et al. | 395/650 |
| 4,858,105 | 8/1989 | Kuriyama et al. | 395/375 |
| 4,924,376 | 5/1990 | Ooi | 395/375 |
| 4,928,226 | 5/1990 | Kamada et al. | 395/375 |
| 5,051,940 | 9/1991 | Vassiliadis et al. | 364/736 |
| 5,073,855 | 12/1991 | Staplin et al. | 395/375 |
| 5,201,057 | 4/1993 | Uht | 395/800 |
| 5,377,339 | 12/1994 | Saito et al. | 395/375 |

FOREIGN PATENT DOCUMENTS

2702586B2 1/1977 Germany .

OTHER PUBLICATIONS

"The i906CA SuperScalar Implementation of the 80960 Architecture" by S. McGeady, 1990 IEEE, pp. 232–240.

"Organizations of An Extended Superscalar Processor Prototype Based on the SIMP", by T. Hara et al, Interdisciplinary Graduate School of Engineering Sciences, Kyushu University.

Gurindar S. Sohi, "Instruction Issue Logic for High-Performance, Interruptible, Multiple Functional Unit, Pipelined Computers", IEEE Transactions on Computers, vol. 39, No. 3 (Mar. 1990).

Primary Examiner—Alyssa H. Bowler
Assistant Examiner—Alpesh M. Shah
Attorney, Agent, or Firm—Lowe, Price, LeBlanc & Becker

[57] ABSTRACT

Availability flag registers are used for storing flags ia1–ia4 indicating the availability of instructions IR1–IR4 stored in an instruction register. The flags ia1–ia4 are controlled in accordance with misalignment information which represents the degree of an address accessing an instruction cache being shifted from a four word boundary. Upon determining whether or not issuance of an instruction from instruction decoder is possible, it is determined to be unissuable if an availability flag corresponding to each instruction is off. A logic structure for nullifying an instruction stored in an instruction register, when an address in accessing instruction cache 1 is shifted from the four word boundary is implemented without providing the instruction register with a resetting function, and thus a circuit for implementing this logic can be constructed with a reduced number of transistors.

6 Claims, 6 Drawing Sheets

| PC <3:2> | misalign <3:1> | SHIFT FROM WORD BOUNDARY |
|---|---|---|
| 0  0 | 0  0  0 | 0 |
| 0  1 | 1  0  0 | 1 |
| 1  0 | 1  1  0 | 2 |
| 1  1 | 1  1  1 | 3 |

FIG. 3C (a) | INSTRUCTION 0 | INSTRUCTION 1 | INSTRUCTION 2 | INSTRUCTION 3 | : FETCH 4 INSTRUCTIONS, ISSUE INSTRUCTION 1

(b) | UNAVAILABLE | INSTRUCTION 1 | INSTRUCTION 2 | INSTRUCTION 3 | : FETCH SAME 4 INSTRUCTIONS, ISSUE INSTRUCTIONS 1 AND 2

(c) | UNAVAILABLE | UNAVAILABLE | UNAVAILABLE | INSTRUCTION 3 | : FETCH SAME 4 INSTRUCTIONS, ISSUE INSTRUCTION 3

(d) | INSTRUCTION 4 | INSTRUCTION 5 | INSTRUCTION 6 | INSTRUCTION 7 | : FETCH NEXT 4 INSTRUCTIONS

PARALLEL PROCESSING WITH IMPROVED INSTRUCTION MISALIGNMENT DETECTION

This application is a continuation of application Ser. No. 07/905,988 filed Jun. 29, 1992, now abandoned.

BACKGROUND OF THE INVENTION

1. Field of the Invention

The present invention relates generally to parallel operation processing devices, and more specifically, to an instruction fetching method in a superscalar type processor (hereinafter simply referred to as a superscalar).

2. Description of the Background Art

The superscalar is a processor including the following features:

(1) fetching of a plurality of instructions at a time, (2) provision of a plurality of function units, and execution of a plurality of instructions at a time using these units, and (3) finding of instructions which can be executed at a time among the plurality of instructions fetched at a time, and dispatching of these simultaneously executable instructions to corresponding function units.

FIG. 1 is a diagram showing a general structure of a superscalar. In FIG. 1, the superscalar includes an instruction cache (instruction memory) 1 for storing instructions, an instruction fetch stage (IF) 2 for transmitting the addresses of instructions to be fetched to instruction memory 1, and an instruction decode stage (ID) 3 for executing operations such as decoding of the plurality of instructions fetched from instruction memory 1, reading of an instruction of a register file, and executing of a branch instruction. Instruction decode stage (ID) 3 also has a function of finding simultaneously executable instructions from the decoded plurality of instructions and dispatching (issuing) these simultaneously executable instructions to corresponding ones among function units 4a, 4b, 5 and 6. Function units 4a, 4b, 5 and 6 can execute instructions in parallel with each other. Provided in the structure shown in FIG. 1 are integer calculation units 4a and 4b for executing integer addition, etc., a unit 5 for executing storing of data to a data cache (data memory) 7 or loading of the data therefrom, and a unit 6 for executing a floating point operation.

In the superscalar, instruction fetch stage (IF stage) 2, instruction decode stage (ID stage) 3 and functional units 4a, 4b, 5 and 6 are pipelined. Function units 4a and 4b include an execution stage EXC for executing an instruction given from decode stage 3, and a write back stage (WB stage) for writing the result of the execution to a register file (not shown).

A memory access unit 5 includes an address calculation stage (ADR stage) for calculating the address of data cache 7 in accordance with an instruction from instruction decode stage 3, a memory access stage (MEM stage) for making an access to data cache 7 in accordance with the calculated address, and a write back stage (WB stage) for writing the loaded data from data cache 7 to the register file.

Floating point operation unit 6 includes three instruction stages, EXC1, EXC2, and EXC3 for executing an instruction from instruction decode stage 3, and a write back stage WB for writing the result of the execution to the register file.

In the superscalar, as described above, a plurality of instructions from instruction cache 1 are fetched at a time.

Among the plurality of instructions simultaneously fetched, instructions which can be executed simultaneously are found in instruction decode stage 3 and the found out instructions are issued to corresponding function units. Function units 4a, 4b, 5 and 6 can execute instructions in parallel with each other. In the superscalar, an improved processing speed can be provided as compared to a usual processor, because a plurality of instructions are executed at a time.

FIG. 2 schematically shows the structure of the essence of an instruction fetch stage (IF) and an instruction decode stage (ID stage) in a conventional superscalar. In the structure of the superscalar shown in FIG. 2, four instructions are simultaneously fetched and decoded.

In FIG. 2, the instruction fetch stage (IF) includes a program counter (PC) for holding the first instruction address of a plurality of instructions to be fetched from instruction cache 1. In the instruction fetch stage (IF), program counter 8 applies a pointer IC_addr to instruction cache 1, and reads corresponding instructions (four instructions) simultaneously. The address from program counter 8 is subjected to addition of 16 in an adder 9 (if all the four instructions are issued). The output of adder 9 provides a fetch address in the next cycle. The address from program counter 8 is of 30 bits <31:2>, and the more significant 28 bits <31:4> are applied to instruction cache 1. The term <31:2> indicates that the most significant address bit is A31, and the least significant address bit is A2.

Instruction cache 1 reads the four instructions in accordance with the address <31:4> of the applied 28 bits, asserts a signal IC_ready indicating the reading of these instructions, transmits the signal onto a signal line 10, and transmits data IC_data onto an instruction bus 11.

A misalignment calculation unit 17 calculates the boundary of words among the four instructions (IR1, IR2, IR3, and IR4) read out from instruction cache 1, or the data IC_data, and calculates a signal misalign representing the boundary. The calculation of the boundary of words is executed based on an address <3:2> of the less significant 2 bits from program counter, which will later be described in detail.

Instruction decode stage (ID stage) includes instruction registers 12a, 12b, 12c, and 12d for temporarily latching instructions read out from instruction cache 1, an instruction decoder 13 for decoding the instructions IR1, IR2, IR3, and IR4 stored in instruction registers 12a–12d, and a register 14 for latching the signal IC_ready from instruction cache 1.

The instructions IR1, IR2, IR3, and IR4 from instruction cache 1 are unconditionally written in instruction registers 12a–12d. The data IC_data from instruction cache 1 includes four parallel instructions IR1, IR2, IR3, and IR4.

Whether or not the instructions written in instruction registers 12a–12d are available is determined based on whether or not the signal IC_ready generated from instruction cache 1 is on. Register 14 latches the signal IC_ready for indicating whether or not the instructions IR1–IR4 stored in instruction registers 12a–12d are available. The latch signal is herein designated with the prefix "ia".

Instruction decoder 13 produces operation codes, code 1, code 2, code 3, and code 4 for indicating executions in related function units based on instruction codes preprogrammed therein, and transmits the produced codes onto signal lines 15a, 15b, 15c, and 15d, respectively. Instruction decoder 13 also transmits, with respect to instructions which can be issued to the function units, flags ia_out 1, ia_out 2, ia_out 3, and ia_out 4 for indicating that these instructions are issuable (available) onto signal lines 16a, 16b, 16c, and 16d.

These operation codes, code 1–code 4 and availability flags ia_out 1–ia_out 4 are transmitted to the execution stages EXEC1 or ADR of corresponding function units, respectively.

These operation codes, code 1–code 4 are executed in the corresponding function units, respectively. Various methods are embodied or proposed for the manner of the execution. Generally, an operation is executed in a corresponding function unit in accordance with an applied operation code.

Four instructions are simultaneously read out from instruction cache 1. However, as will be described later in detail, it is not possible to read simultaneously from instruction cache 1, four instructions from arbitrary addresses. The addresses at which the four instructions can be read out from instruction cache 1 at a time are provided by the boundary of four words. A description of the reading of these four instructions will be provided with reference to the states shown below in which instructions are stored in instruction cache 1.

| Address | Instruction | |
|---------|-------------|---|
| 4n | Instruction 0 | |
| 4n + 4 | Instruction 1 | |
| 4n + 8 | Instruction 2 | |
| 4n + 12 | Instruction 3 | |
| 4 (n + 4) | Instruction 4 | Boundary of 4 words |
| 4 (n + 4) + 4 | Instruction 5 | |
| 4 (n + 4) + 8 | Instruction 6 | |
| 4 (n + 4) + 12 | Instruction 7 | |

If a fetch address (the output PC of program counter) is 4n, the instruction 0, instruction 1, instruction 2, and instruction 3 can be read out. If the fetch address (pointer PC) is 4n+8, the instructions 2, instructions 3, instruction 4, and instruction 5 can not be read out. Instruction cache 1, in this case, outputs the instruction 0, instruction 1, instruction 2, and instruction 3. When instruction decode stage (ID stage) takes the applied instruction into instruction register 12, instruction registers 12c and 12d take in instructions applied as IR3 and IR4, but instruction registers 12a and 12b do not take in the applied instructions, instruction 0 and instruction 1 as instructions IR1 and IR2. Registers 12a and 12b are reset. More specifically, registers 12a and 12b store an instruction "hop (no operation)".

Information for resetting instruction register 12 is produced by calculating the shift or displacement of the pointer PC generated from program counter (PC) 8 from the boundary of four words, or the amount of misalignment. The calculation of the misalignment amount is executed by misalignment calculation unit 17. Misalignment calculation unit 17 produces information misalign on misalignment from the PC <3:2> of the less significant 2 bits of pointer PC from program counter 8 and transmits the produced information to instruction register 12. The misalignment information misalign has three bits <3:1>, and the bits of the three bit data <3:1> are provided to instruction registers 12a, 12b, and 12c, respectively. Adder 9 adds the value of the number of issued instructions×4 to the pointer PC by a signal from a path (not shown) from instruction decoder 13.

FIG. 3A is a representation showing in a table, a logic executed by this misalignment calculation unit 17, and FIG. 3B shows the logical structure of misalignment calculation unit 17. When the pointer PC <3:2> is, for example, "00", it means that instructions from the boundary of words are read out. More specifically, the amount of misalignment in this case is 0. Misalignment information, misalign <3:1>, resets register 12a, registers 12a and 12b, register 12a, and registers 12b and 12c in accordance with the amounts of misalignment 0, 1, 2, and 3, respectively. As shown in FIG. 3C, following four instructions are not fetched until a group of four instructions are all issued. This group of four instructions are repeatedly fetched until all of them are issued.

Four instructions can only be read out simultaneously from the boundary of the four words of instruction cache 1, because cache memory 1 is formed of four memories, and the four memories are accessed by one address IC_addr. This structure is shown in FIG. 4.

In FIG. 4, instruction cache 1 includes four memories 19a, 19b, 19c and 19d. Memory 19a stores an instruction of an address 16m (m is an arbitrary integer). Memory 19b stores an instruction of an address 16m+4. Memory 19c stores an instruction of an address 16m+8. Memory 19d stores an instruction of an address 16m+12. One instruction is of 32 bits and stored over four addresses.

The same fetch address IC_addr is applied to these four memories 19a–19d. Instructions to be read simultaneously are stored in the same addresses of memories 19a–19d. Therefore, serial four instructions, an instruction 4M, an instruction 4M+1, an instruction 4M+2, and an instruction 4M+3 are read out from cache 1 from the address 16m of the four word boundary. However, four instructions starting at an address which does not lie at the four word boundary, for example, an address of 16m+4, can not be read out simultaneously. In that case, the instructions of addresses 16m, 16m+4, 16m+8, and 16m+12 are again read out. It is to be noted that the fetch address IC_addr does not include the less significant 2 bits <3:2> among the pointer PC <31:2> of program counter 8.

Producing two fetch addresses and providing a circuit for shifting an output from instruction cache 1 in accordance with the address values make it possible to read four instructions from an arbitrary address from instruction cache 1. The provision of such a structure however increases the time for accessing instruction cache 1 and impairs the high speed operation of a processor.

The conventional method of fetching an instruction which does not exist at a four word boundary requires a resetting circuit for instruction registers 12a, 12b, and 12c. The number of transistors necessary for instruction register 12 increases as a result, resulting in a disadvantage in terms of power consumption, area occupied by a chip, etc.

FIG. 5 shows the structure of a conventional latch circuit generally for use in a register, and FIG. 6 shows the structure of a latch circuit with a resetting terminal. A signal "clock" shown in FIGS. 5 and 6 is a clock for driving this superscalar, and defines the cycle of pipelining operation.

An inverter circuit requires two transistors at minimum, i.e. complementarily connected a p channel MOS (insulating gate type field effect) transistor and an n channel MOS transistor. In the case of the structure of the latch circuit shown in FIG. 5, ten transistors are necessary accordingly.

The structure of the latch circuit with resetting terminal shown in FIG. 6 requires a two-input NOR circuit for implementing its resetting function. The two-input NOR circuit usually includes two n channel MOS transistors OR-connected for discharging an output portion, and two AND-connected p channel MOS transistor for charging the output portion. That is, NOR circuit NR2 requires four transistors. The latch circuit with resetting terminal shown in FIG. 6 therefore requires 12 transistors all together.

As for instruction register 12 shown in FIG. 2, with the latch circuit with resetting terminal being used for three instruction registers 12a, 12b, and 12c, extra 192 (2×32×3) transistors will be necessary as compared to a structure using a usual latch circuit (the length of instruction is 32 bits).

In the latch circuit with resetting terminal (see FIG. 6), time delay is greater due to its gate circuit for resetting as compared to the usual latch circuit shown in FIG. 5, which gives rise to extension of the cycle time.

SUMMARY OF THE INVENTION

It is an object of the present invention to provide a parallel processing device requiring a reduced number of transistors for forming an instruction register provided in the preceding stage of an instruction decoder, and having a reduced cycle time.

Another object of the present invention is to implement a circuit for achieving a control function when fetching of an instruction which does not exist in a 4-word boundary, with a reduced number of transistors.

A parallel processing device in according with the present invention includes a plurality of registers for storing instructions given from an instruction memory, and a plurality of availability registers provided correspondingly to the registers for storing information indicating whether or not the content of a corresponding register is available.

The instruction register is formed of a usual latch circuit, and, therefore, the number of transistors forming the instruction register is reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3(a)–(c) are a representation showing a logic, a structure and an instruction fetching sequence implemented by a misalignment calculation unit;

DESCRIPTION OF THE PREFERRED EMBODIMENTS

Figure 5:
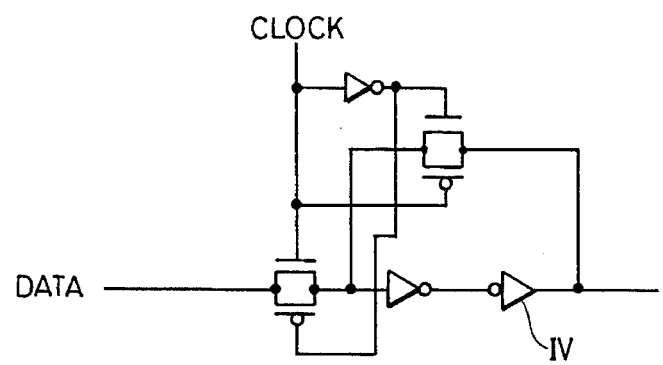
FIG. 5 is a diagram showing a structure of a latch circuit without a resetting terminal.
Figure 6:
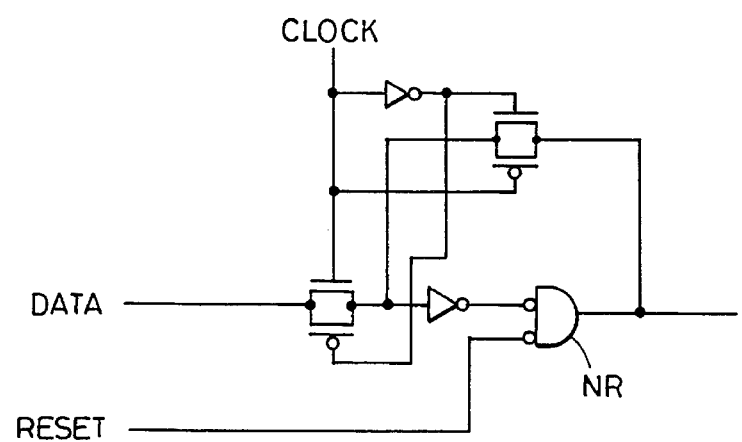
FIG. 6 is a diagram showing a structure of a latch circuit with a resetting terminal.
Figure 7:
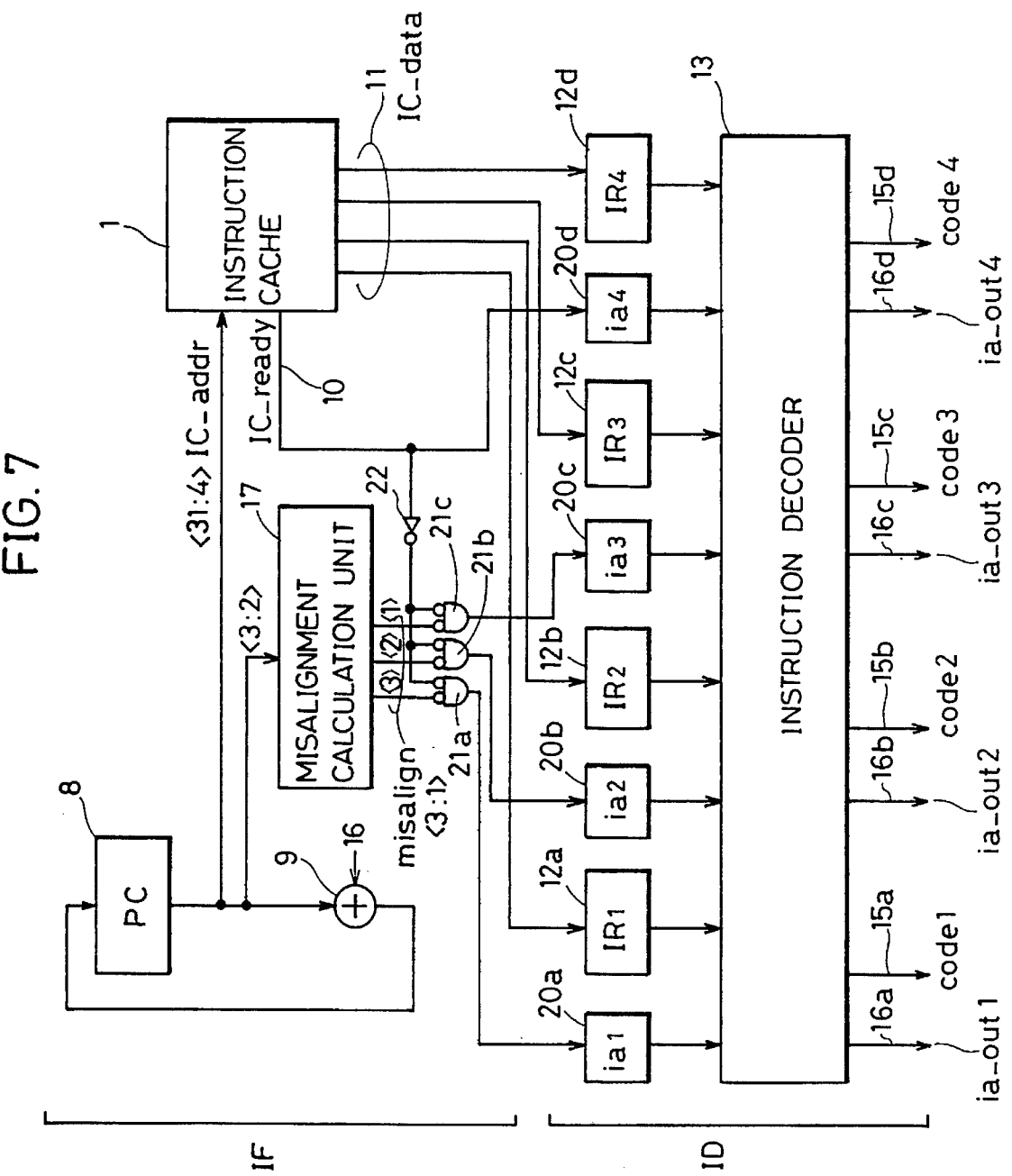
FIG. 7 is a diagram showing the structure of a part related to instruction fetch of a superscalar in accordance with one embodiment of the present invention.

FIG. 7 shows the structure of the essence of a parallel operation processing device in accordance with one embodiment of the present invention. In FIG. 7, instruction registers 12a–12d are each formed of a usual latch circuit as shown in FIG. 5, and have their resetting functions removed. Availability flag registers 20a–20d are provided correspondingly to instruction registers 12a–12d. Availability flag register 20a stores a flag, ia1, indicating the availability of an instruction IR1 to be stored in instruction register 12a. Availability flag register 20b stores an availability flag ia2 indicating the availability of an instruction IR2 to be stored in instruction register 12b. Availability flag register 20c stores an availability flag, ia3, indicating the availability of an instruction IR3 to be stored in instruction register 12c. Availability flag register 20d stores a flag ia4 indicating the availability of an instruction IR4 to be stored in instruction register 12d.

In the structure shown in FIG. 7, a register for storing a signal IC_ready indicating supply of instructions from instruction cache 1 is not provided.

In the structure shown in FIG. 7, in the event of misalignment, the availability flag, ia, related to a corresponding instruction register is turned off. More specifically, the logics in the following are achieved.

ia1=IC_ready*/misalign <1>
ia2=IC_ready*/misalign <2>
ia3=IC_ready*/misalign <3>
ia4=IC_ready , where the symbol "*" indicates a logical product operation, and the symbol "/" represents negation.

The above-presented logics are achieved by an inverter 22 for receiving the signal IC_ready from instruction cache 1, and NOR circuits 21a, 21b, and 21c for receiving the output of inverter 22 at inputs and receiving corresponding bits of misalignment information misalign <3:1> from misalignment calculation unit 17 at the other inputs. The output of NOR circuit 21a is supplied to availability flag register 20a. The output of NOR circuit 21 is supplied to availability flag register 20b. The output of NOR circuit 21c is supplied to availability flag register 20c.

When the availability flag is off, an issuability indication flag ia_out provided in accordance with the signal IC_ready is turned off in a conventional method. More specifically, instruction decoder 3 determines the values of issuability indication flags ia_out1–ia_out4 in accordance with availability flags ia1–ia4 attached to instructions IR1–IR4. More specifically, the following is executed in instruction decoder 3.

ia_out1=/ia1* (condition in which IR1 can be issued)
ia_out2=/ia2* (condition in which IR2 can be issued)
ia_out3=/ia3* (condition in which IR3 can be issued)
ia_out4=/ia4* (condition in which IR4 can be issued)

In the above logical expressions, "*" represents a logical product operation, and "/" represents negation. The structure of misalignment calculation unit 17 is similar to the conventional one.

Figure 1:
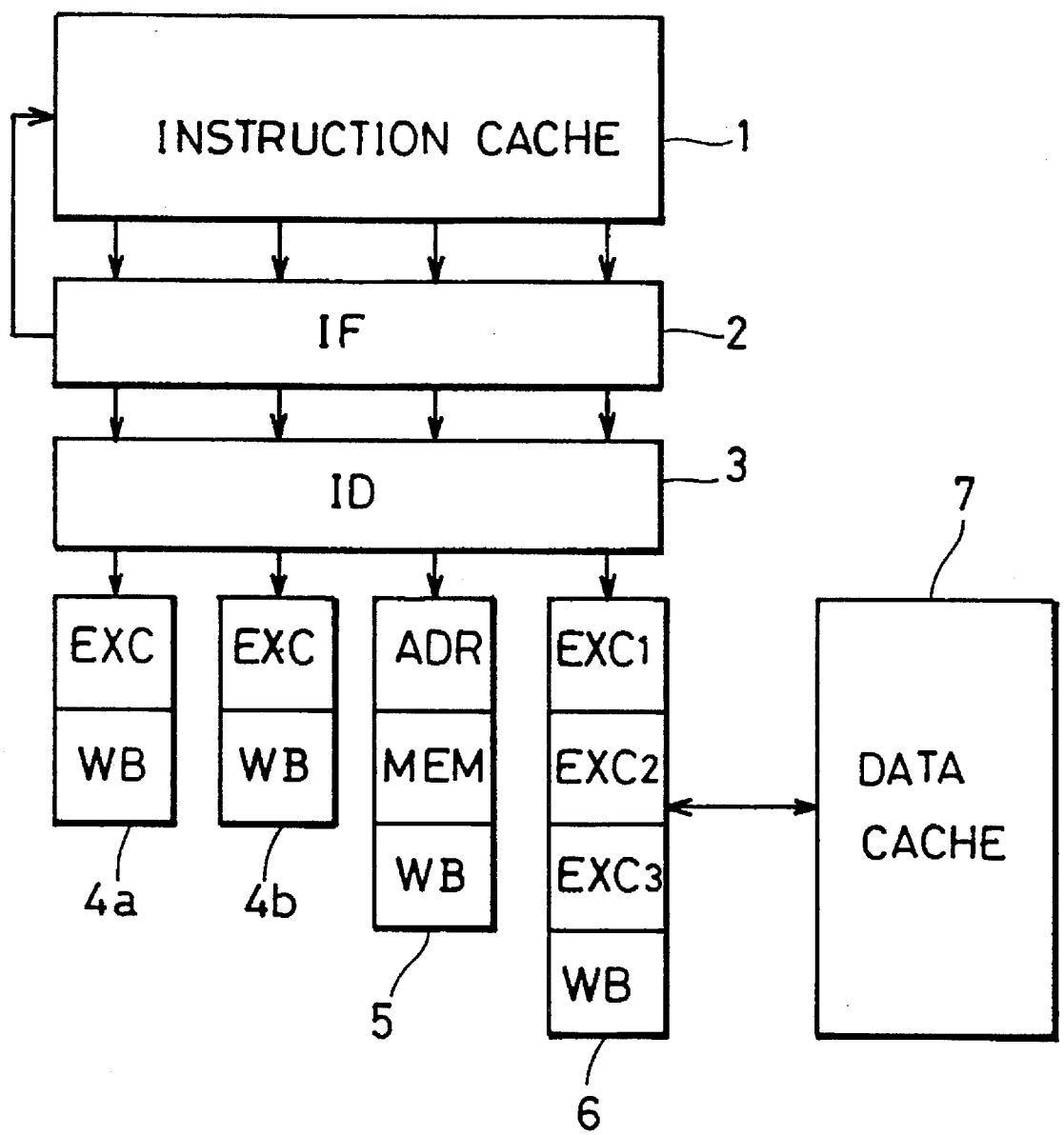
FIG. 1 is a diagram showing a general structure of a superscalar.
Figure 2:
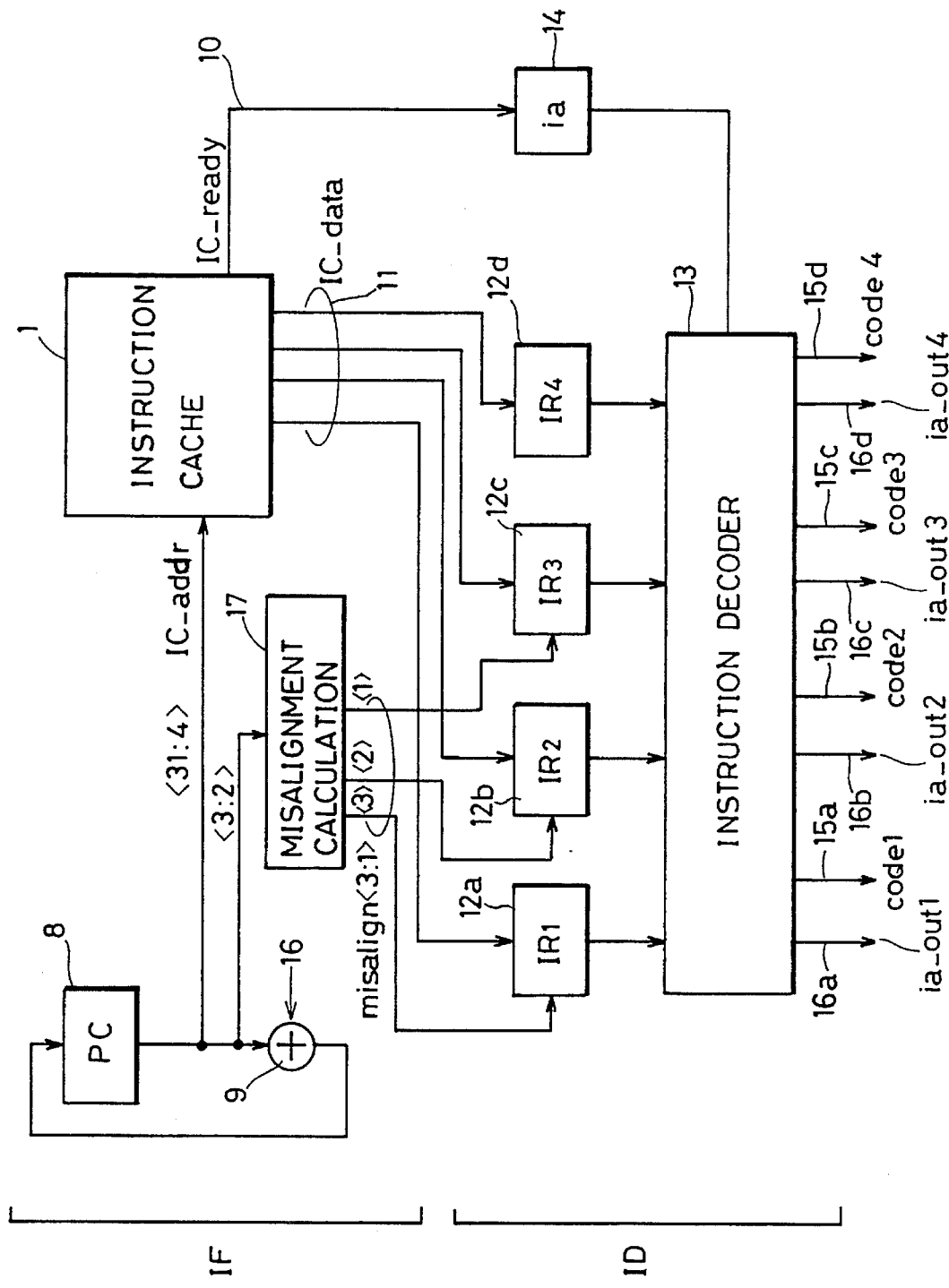
FIG. 2 is a diagram schematically showing the instruction fetching stage and instruction decode stage of a conventional superscalar.
Figures 3A, 3B:
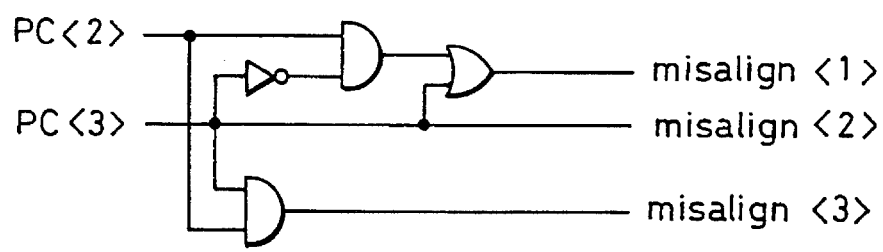
Figure 4:
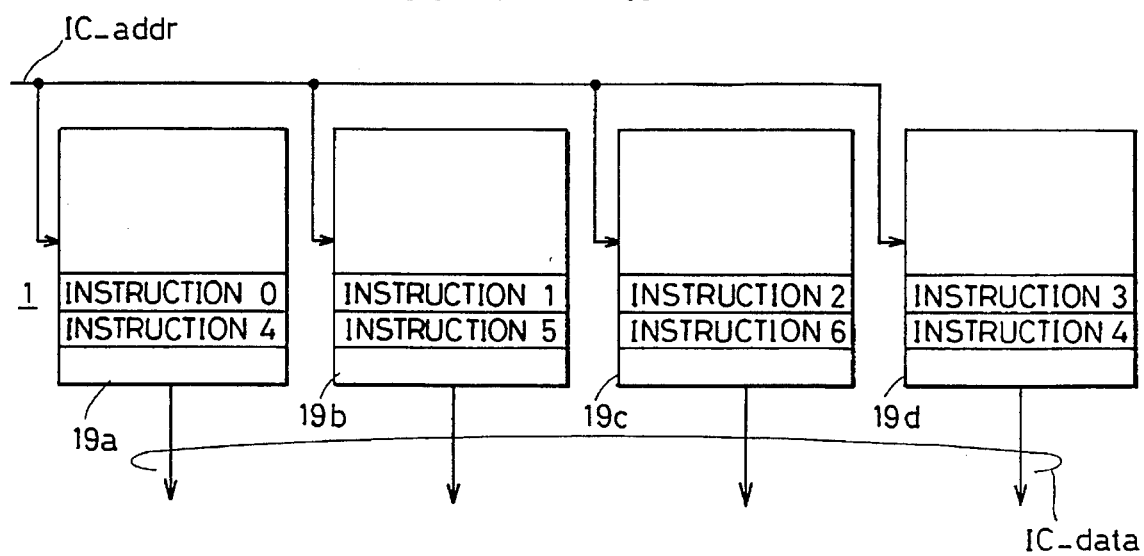
FIG. 4 is a diagram schematically showing a structure of an instruction cache.

As the latch circuit forming instruction register 12 does not require a resetting function in the circuit structure shown in FIG. 7, and, therefore, 192 transistors are not necessary. Furthermore, as register 14 is no longer necessary, further ten transistors can be removed. The component transistors are increased by forty transistors (4×10) required for availability flag register 20 provided to instruction register 12, twelve transistors (3×4) for NOR circuit 21, and two transistors for inverter 21. In other words, in the structure shown in FIG. 7, the number of transistors are reduced by 148 as compared to the structure shown in FIG. 2.

As described above, according to the invention, the number of transistors for forming a circuit for adjusting misalignment can be greatly reduced. Furthermore, with no resetting function provided in an instruction register, time delay in the instruction register can be reduced, thereby providing improvements of performance such as high speed operation of a parallel processing device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel processor, comprising:

an instruction memory;

a plurality of function units each for achieving a prescribed function;

a plurality of instruction register means for respectively storing the instructions fetched from said instruction memory, and a plurality of availability data register means each associated with a corresponding one of said plurality of instruction register means for storing data indicating that an instruction stored in a corresponding instruction register means is available; and decoder means for simultaneously fetching a plurality of instructions from the instruction memory, finding simultaneously executable instructions among the fetched instructions, and issuing these simultaneously executable instructions to respective function units which can perform a function required by the instruction;

the stored instruction of said instruction register means and the data of the availability data register means being provided to said decoder means in parallel with each other;

wherein the system further comprising:

address producing means for producing a fetch address of said instruction memory;

misalignment calculation means for indicating a degree of misalignment between an address of a first instruction of the plurality of instructions read out simultaneously from said instruction memory and said fetch address, said plurality of instructions read out simultaneously including first through last instructions; and availability data producing means for producing availability data for each of the plurality of instructions read out simultaneously from said instruction memory, from an instruction transmission signal (IC_ready) from said instruction memory and from misalignment information from said misalignment calculation means, and writing the produced availability data to related availability data register means.

2. A parallel processor as recited in claim 1, wherein said instruction register means includes a non-resettable latch circuit.

3. A parallel processor as recited in claim 1, wherein said availability data register means includes a non-resettable latch circuit.

4. A parallel processor as recited in claim 1, wherein said misalignment information of said misalignment calculation means includes instruction specifying information for specifying an instruction between said fetch address and the address of said first instruction, said availability data producing means includes: (a) means for transmitting said instruction transmission signal as availability data for the instruction of an address of the last instruction among the instructions fetched simultaneously, and (b) means for producing the availability data of each of the instructions from instruction specifying information and said instruction transmission signal, for respective instructions between said first address and the last address.

5. A parallel processor as recited in claim 1, wherein said decoder means includes means for (a) receiving the instruction from said instruction register means and the data from said availability data register means, (b) finding instructions executable simultaneously, and (c) producing an issuability indication flag for each of the instructions from the availability data and data indicating which instructions can be executed simultaneously.

6. A method of operating a parallel processor including a plurality of function units each for executing a prescribed function and capable of executing a plurality of instructions simultaneously with other instructions, comprising the steps of:

producing an address pointer and fetching a plurality of instructions simultaneously from an instruction memory, said address pointer including a fetch address indicating a first address of said plurality of instructions, and a misalignment address indicating a degree of misalignment between the fetch address and the address pointer, said instruction memory producing an instruction transmission flag when transmitting the instructions;

storing said plurality of instructions in parallel in a non-resettable register;

producing an availability flag for indicating availability/ unavailability of each of said plurality of instructions in accordance with said misalignment address and said instruction transmission flag; and storing thus produced availability flags correspondingly to each of said instructions;

wherein the method further comprising the steps of:

receiving the instructions in said non-resettable register and said availability flags in parallel, finding instructions simultaneously executable, producing an issuability flag from the availability flag and the data indicating which instructions can be executed simultaneously, and issuing the issuability flag and executable instruction in linkage to a corresponding function unit.

* * * * *